United States Patent [19]

Christopher

[11] 4,278,992
[45] Jul. 14, 1981

[54] PCM DETECTOR FOR VIDEO REPRODUCER APPARATUS

[75] Inventor: Todd J. Christopher, Indianapolis, Ind.

[73] Assignee: RCA Corporation, New York, N.Y.

[21] Appl. No.: 125,640

[22] Filed: Feb. 28, 1980

[51] Int. Cl.$^3$ ............................................. H04N 8/493
[52] U.S. Cl. ...................................... 358/13; 329/105; 358/23; 360/29; 375/94
[58] Field of Search ................... 358/4, 13, 12, 21, 23; 329/104, 102, 105; 375/25, 94; 179/15 AP; 360/29

[56] References Cited

U.S. PATENT DOCUMENTS

| | | | |
|---|---|---|---|
| 3,728,484 | 4/1973 | Hawkey et al. | 375/94 |
| 4,225,964 | 9/1980 | Cagle et al. | 375/86 |

OTHER PUBLICATIONS

Aerospace Telemetry Stiltz, pp. 190-191, 1961.

Primary Examiner—Robert L. Richardson
Attorney, Agent, or Firm—E. M. Whitacre; J. S. Tripoli; R. G. Coalter

[57] ABSTRACT

An integrator integrates the central portion of each signaling interval of a PCM input signal for a time less than the reciprocal of the PCM baud rate. Means responsive to the integrated signal or a manifestation thereof performs a comparison operation at the end of the integration period and stores the result until the end of the next following period. The integrator is reset between integration periods when transitions of the signal are likely to occur whereby immunity to PCM signal amplitude variations and transition edge distortion is enhanced and the probability that the integration will be monotonic is enhanced, thereby reducing the detector error rate.

5 Claims, 3 Drawing Figures

PCM DETECTOR FOR VIDEO REPRODUCER APPARATUS

This invention relates to detectors and particularly to synchronous non-return-to-zero (NRZ) pulse code modulation (PCM) detectors suitable for recovering digital data from a multi-level input signal. The invention is especially useful in video reproducer apparatus where time base errors may result in variation of the signal baud rate and where noise may also accompany the signal.

In the copending U.S. Patent Application of T. J. Christopher and C. B. Dieterich entitled "IMPROVED DIGITAL ON VIDEO RECORDING AND PLAYBACK SYSTEM" Ser. No. 084,465, filed Oct. 12, 1979, it is proposed that digital data be recorded on a video disc during selected lines of the vertical blanking interval and that the data be recovered on playback of the disc for controlling various player functions such as program and playing time identification, locked groove identification and escape, record scanning, etc. PCM is a preferred means of encoding the digital data because (unlike PAM and PWM) it is essentially a digital technique which facilitates error checking and correction of the recovered data. Non-return-to-zero PCM encoding, as well as synchronous transmission is preferred in order to maximize the data transmission rate within the relatively limited bandwidth available on the video disc.

Christopher and Dieterich propose that the PCM data be represented by the video signal level (e.g., luminance) and be sampled (detected) using the color subcarrier as a source of clock signals. By this means, time-base errors which may be present in the luminance signal are also present in the clock signal (derived from chroma burst) and tend to offset each other. To illustrate the principle, if the baud rate of the data tended to vary (due, for example, to warpage or eccentricity of the record) the color burst frequency will vary in the same sense so that, in principle at least, the clock signal will always have a known time relationship with respect to the data signal. This relationship holds true for players designed for variable speed turntables (the constant linear velocity type) and also for players designed for fixed turntable speeds (the constant angular velocity type).

In addition to providing a solution to the clock data synchronization problem mentioned above, Christopher and Dieterich further propose a solution for minimizing a source of data errors caused by shifts in the d.c. level of the video signal. The player they propose utilizes buried subcarrier encoding of the chrominance signal, that is, the chrominance signal recorded on the disc is located or "buried" within the luminance band as taught by Pritchard in U.S. Pat. No. 3,872,498 and is recovered upon playback by means of comb filtering as described in U.S. Pat. No. 3,996,606 (also Pritchard). Christopher and Dieterich propose that the horizontal line adjacent to the line containing data be of constant luminance level. Such an arrangement permits the use of a signal already available in the player, namely the chrominance related output of the comb filter, as the data signal. Since the comb filter subtracts one line from an adjacent line the output is self referenced thereby substantially minimizing the probability of data errors caused by changes in the d.c. level of the video signal.

The present invention is directed to providing further advances in PCM video processing over those mentioned above. The invention resides in part in recognition that the transmission channels through which the data and the synchronizing signals pass may have different bandwidths, delays, etc., so that noise present in one channel may be of a different character than that present in another, that is, the cross correlation function between the data channel noise and the clock or synchronizing channel noise may be less than unity.

A second aspect of the invention resides in recognition of the disadvantages of conventional predetection and post detection integration type noise reduction techniques as applied to PCM data in which substantial leading and trailing edge distortion may occur owing, for example, to differences in signal channel and timing channel transmission characteristics.

A third aspect of the invention resides in recognition that, in a video disc player of the type in which serial NRZ PCM data represented by amplitude levels of the video signal is synchronously detected by means of a clock signal derived from the color burst component of the video signal, the clock signal should not be phased so as to cause sampling of the anticipated center of the data signaling interval.

In accordance with the invention a synchronous detector for recovering digital data from a PCM input signal comprises means for periodically integrating the input signal, the integration period taking place at a time other than one at which a transition of said PCM input signal is likely to occur and lasting for a period less than one signaling interval of the PCM input signal and means responsive to the integrated signal or a manifestation thereof for performing at least one comparison operation at the end of the integration period and storing the result until the end of the next following period.

As will be discussed in detail, subsequently, a PCM detector utilizing the principles of the invention offers substantially improved noise performance because data is integrated during periods between anticipated transitions where the effective signal to noise ratio is substantially peaked.

Of particular benefit is the increased probability that what is integrated will result in a monotonic change in the integrator output thereby greatly reducing detection uncertainty. Also, as will be explained, the invention may be applied to multi-level PCM transmission systems in which the bit rate is greater than the baud rate.

In accordance with a further feature of the invention (particularly desirable in video disc players of the type proposed by Christopher and Dieterich) further improvement in terms of bit error rate reduction may be facilitated by selective removal of the direct current component of the PCM signal. This provides the benefit of minimizing very low frequency perturbations not counteracted by the technique of transmitting a line of constant luminance level adjacent to the line containing data.

In accordance with yet another aspect of the invention means are provided for resetting the integrator to a predetermined reference level between integration periods, said predetermined reference level being selected to be substantially equal to a decision threshold level associated with the comparison operation performing means which desirably includes means for storing the result of the comparison operation for a predetermined period of time. Preferably, the predetermined period of time equals the clock period and is independent of the ratio between the PCM signaling baud rate and the data bit rate.

Figure 1:
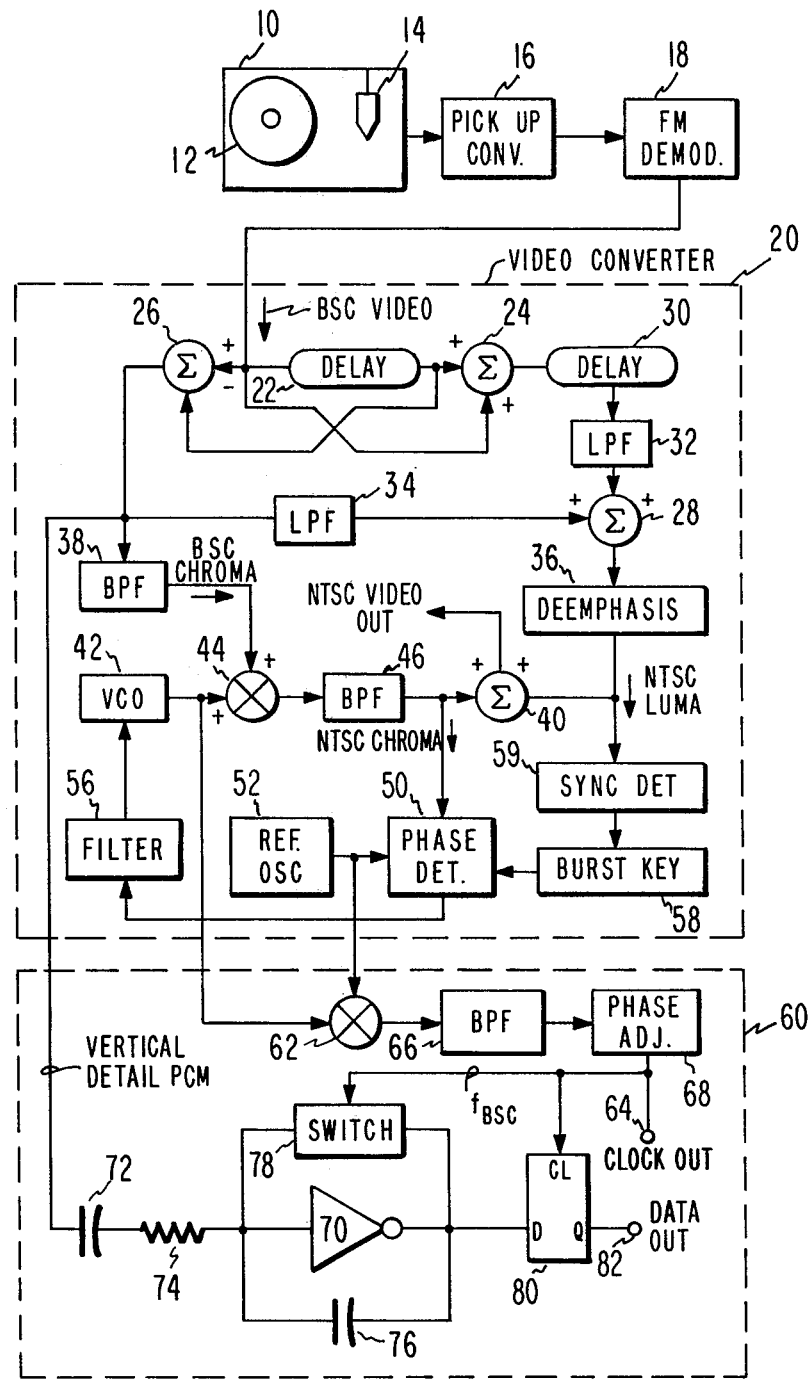
FIG. 1 is a block diagram, partially in schematic form, of a PCM detector embodying the invention interfaced with a video disc player for recovering digital data from a video signal component produced by the player.

The video disc player in FIG. 1 comprises a turntable 10 for rotating video disc 12 and a pickup transducer 14 for recovering information signals from the disc. Illustratively, it will be assumed that the player is intended for use with records in which information is stored in the form of topological variations and recovered by sensing capacitance variations between pickup transducer 14 and the record 12. The output of transducer 14 is coupled to the input of a pickup converter circuit 16 which comprises a capacitance-to-voltage converter responsive to capacitance variations between a stylus in transducer 14 and the record being played for producing an FM output signal voltage representative of the recorded information. Such records and suitable circuits for implementing the capacitance-to-voltage conversion function of pickup circuit 16 are well known. See, for example, U.S. Pat. No. 3,783,196 entitled "HIGH-DENSITY CAPACITIVE INFORMATION RECORDS AND PLAYBACK APPARATUS THEREFOR" which issued to T. O. Stanley, Jan. 1, 1974; U.S. Pat. No. 3,972,064 entitled "APPARATUS AND METHODS FOR PLAYBACK OF COLOR PICTURES/SOUND RECORDS" which issued to E. O. Keizer, July 27, 1976, and U.S. Pat. No. 3,711,641 entitled "VELOCITY ADJUSTING SYSTEM" which issued to R. C. Palmer, Jan. 16, 1973.

Video FM demodulator circuit 18 converts the FM signal produced by pickup circuit 16 to a video output signal. For purposes of illustrating certain features of the invention, it will be assumed that the video signals recorded on the disc are in the previously mentioned "buried subcarrier" (BSC) format rather than the conventional NTSC format. An illustrative subcarrier frequency choice is in the vicinity of 1.53 MHz, with the color subcarrier side bands extending ±500 KHz thereabout and, with the luminance signal band extending well above the highest color subcarrier frequency (to 3 MHz, for example). It will also be assumed that digital data is encoded in the video signal as proposed in the aforementioned Christopher and Dieterich application.

FM demodulator 18 illustratively may be of the pulse counting type or of the phase-lock-loop (PLL) type. A suitable pulse counting type FM demodulator is disclosed in U.S. Pat. No. 4,038,686 entitled "DEFECT DETECTION AND COMPENSATION" which issued to A. L. Baker, July 26, 1977. An FM demodulator of the phase lock loop type is described in U.S. patent application, Ser. No. 948,013 of T. J. Christopher, et al. entitled "FM SIGNAL DEMODULATOR WITH DEFECT DETECTION" which was filed Oct. 2, 1978.

The composite video signal produced by FM demodulator 18 is converted from the BSC format to an NTSC format by video converter 20 (outlined in phantom). The BSC video signal is supplied to the input of delay line 22 and is summed with the output of delay line 22 by means of summation circuit 24 to thereby form a comb filter which separates the luminance component from the composite color video signal. The delay of delay line 22 is selected such that the luminance comb filter has frequency response characteristized by multiple response peaks falling at even integral multiples at half the nominal horizontal line frequency and multiple rejection notches falling at odd integral multiples of half the nominal line frequency. Illustratively, a suitable delay would be equivalent to one horizontal scan interval.

The output of delay line 22 is subtracted from the BSC video signal by subtraction circuit 26 to thereby form another comb filter which passes the chrominance component of the composite video signal. This chrominance comb filter has a frequency response characteristic having multiple peaks falling at odd integral multiples of half the nominal horizontal line frequency and multiple rejection notches falling at even integral multiples of half the normal line frequency.

Delay line 22 may be a conventional LC delay line, an acoustic delay line or preferably may be of a charge couple device (CCD) type. (See for example, the article by J. Matob, entitled "CHARGE COUPLE DEVICE" which appeared in the January, 1975 issue of Wireless World). Further advantages and examples of comb filtering and video format conversion may be found in: U.S. Pat. No. 3,872,498 entitled "COLOR INFORMATION TRANSLATING SYSTEM" which issued to D. H. Pritchard, Mar. 18, 1975; U.S. Pat. No. 3,996,610 entitled "COMB FILTER APPARATUS FOR VIDEO PLAYBACK SYSTEMS" which issued to H. Kawamoto, Dec. 7, 1976 and the U.S. Patent Application of T. J. Christopher and L. L. Tretter entitled "VIDEO PROCESSING SYSTEM INCLUDING COMB FILTERS" Ser. No. 966,512 which was filed Dec. 4, 1978.

Since the frequency range of the luminance signal component in the BSC format is substantially the same as in the NTSC format, all that remains to provide a proper NTSC luminance output signal is to compensate for preemphasis which was performed in the recording process and to supplement the signal with information relating to vertical detail. Supplementation is provided by coupling the output of summation circuit 24 to one input of a further summation circuit 28 via a cascade connection of delay element 30 and a low pass filter 32 and coupling the output of subtraction circuit 26 to the other input of summation circuit 28 via a low pass filter 34. Suitable design parameters for the coupling elements would be: a delay of about 500 nSec. for delay element 30 (this compensates for the delay through low pass filter 34); a passband of 0–5 MHz for low pass filter 32; and a passband of 0–500 KHz for low pass filter 34. Compensation for preemphasis is provided by coupling the output of summation circuit 28 to the input of deemphasis circuit 36 which preferably has a transfer characteristic complementary to that of the preemphasis circuit used in the recording process.

The output of subtraction circuit 26 contains both low frequency luminance information (which is passed by low pass filter 34 for supplementing vertical detail of the luminance signal as previously mentioned) and the chrominance signal in BSC format. The low frequency information is rejected by connecting the output of subtraction circuit 26 to the input of bandpass filter 38 which preferably has a passband of about 1 MHz centered at the BSC frequency of nominally 1.53 MHz.

Since the frequency range of the chrominance signal in the BSC format (nominally 1.53 MHz) is lower than its range in the NTSC format (nominally 3.58MHz), up-conversion of the output signal of bandpass filter 38 is necessary before the chrominance and luminance signals may be added (in summation circuit 40) to produce an NTSC composite video signal. This frequency translation is provided by voltage controlled oscillator (VCO) 42, multiplier 44 and bandpass filter 46. The output frequency of VCO 42 (when at the center of its control range) is nominally 5.11 MHz. Accordingly, multiplier 44, which mixes or multiplies the BSC chrominance signal produced at the output of bandpass filter 38 with the output of VCO 42, produces output signals of nominally 3.58 and 6.64 MHz. Bandpass filter 46 passes the lower frequency signal (which corresponds to the NTSC chrominance signal standard) to summation circuit 40 where it is summed with the NTSC luminance signal produced at the output of deemphasis circuit 36 to thereby provide a composite video output signal in the NTSC format from the video disc player.

Multiplier 44 and bandpass filter 46 may be of conventional design. It is desirable, however, that VCO 42 feature high stability and be capable of wide frequency deviation. A preferred voltage controlled oscillator having a wide deviation range, is disclosed in the U.S. Patent Application of T. J. Christopher and J. Wilber entitled "VARIABLE FREQUENCY OSCILLATOR," Ser. No. 51,826 which was filed June 25, 1979.

VCO 42, in addition to providing a source of signal for up-conversion of the chrominance signal to NTSC standard, also provides timebase error correction of the converted signal. Timebase errors are detected by means of phase detector 50 which compares the frequency and phase of the color burst component of the chrominance signal produced at the output of bandpass filter 46 with the standard NTSC reference frequency (3.579545 MHz) produced by a reference oscillator 52 and supplies an error voltage to VCO 42 via a filter 56 thereby completing a phase lock loop which varies the frequency of VCO 42 in a sense to minimize errors in the up-converted NTSC chrominance signal. Phase detector 50 is keyed during the color burst interval by means of a burst key generator 58 which is triggered by means of a sync detector 59 which detects horizontal synchronizing pulses present in the luminance signal at the output of deemphasis circuit 36.

PCM detector 60 comprises a multiplier 62 which is interfaced with video converter 20 by coupling one input of the multiplier to the output of VCO 42 and the other multiplier input to the output of reference oscillator 52. By this means the same phase lock loop which provides timebase correction in video converter 20 serves a dual function as a source of continuous clock signals at the buried subcarrier frequency (1.53 MHz) and these clock signals exhibit timebase errors in proportion to the timebase errors present in the luminance (vertical detail) output of lowpass filter 34.

The output signal of multiplier 62 includes sum and difference frequencies of 1.53 MHz and 8.69 MHz. The lower frequency signal is coupled to a clock output terminal 64 by means of a cascade connection of a bandpass filter 66 and a phase adjusting circuit 68. The purpose of circuit 68 is to set the phase of the output clock signal in quadrature with the phase of the buried subcarrier chrominance signal reproduced from the disc. Illustratively, circuit 68 may be an all pass network. Alternatively, the phase shift may be provided by a suitable lead or lag network in combination with a limiter or by means of a suitable delay line.

The signal produced at the output of subtraction circuit 26 is applied to the input of an inverting amplifier 70 in PCM detector 60 by means of series connection of a d.c. blocking capacitor 72 and a current limiting resistor 74. A feedback circuit comprising a parallel connection of an integrating capacitor 76 and an integrator reset switch 78 is coupled between the input and output terminals of amplifier 70. Switch 78 may be conventional bipolar or field effect transistor transmission gate. The output of amplifier 70 is applied to the data input (D) of a D-type flip-flop 80 which has a true output terminal (Q) connected to data output terminal 82. The output signal from phase adjuster 68 is coupled to a control input terminal of switch 78 and to a clock input terminal (CL) of flip-flop 80 for supplying a quadrature phase clock signal thereto. For purposes of discussion, it will be assumed that flip-flop 80 is of the positive edge triggered type and that switch 78 is of a type which closes in response to positive (high) control signal levels.

Flip-flop 80 performs dual functions of comparing the output of the integrator formed by amplifier 70 and capacitor 76 with a threshold voltage and storing the result of the comparison operation. To facilitate this it is preferable that amplifier 70 be of a type which exhibits a quiescent d.c. voltage when switch 78 is closed which is substantially equal to the logic decision threshold level at the data input of flip-flop 80. Amplifier 70 and flip-flop 80 may be, for example, complementary metal oxide semiconductor (C-MOS) integrated circuits. The threshold voltage of C-MOS circuits is nominally equal to about half the supply voltage but has been found to be subject to some variance from chip to chip. The effect of this variation for devices integrated on a common substrate has been found to be minimal insofar as operation of the present invention is concerned and so it is preferable that amplifier 70 and flip-flop 80 be integrated on the same substrate. The threshold turn-on voltage of switch 80 (e.g., a C-MOS transmission gate) is not critical insofar as detection of the integrator output is concerned and so switch 78 may be on the same integrated circuit as amplifier 70 and flip-flop 80 or externally connected to it.

In operation switch 78 is closed in response to the quadrature clock signal during the initial and terminal portions of each PCM signaling interval and opened during the central portions of each signaling interval. Upon each closure of switch 78 flip-flop 80 is clocked whereby the output of the data integrator (70,76) is compared with the threshold voltage of flip-flop 80 and the result stored.

Figure 2:
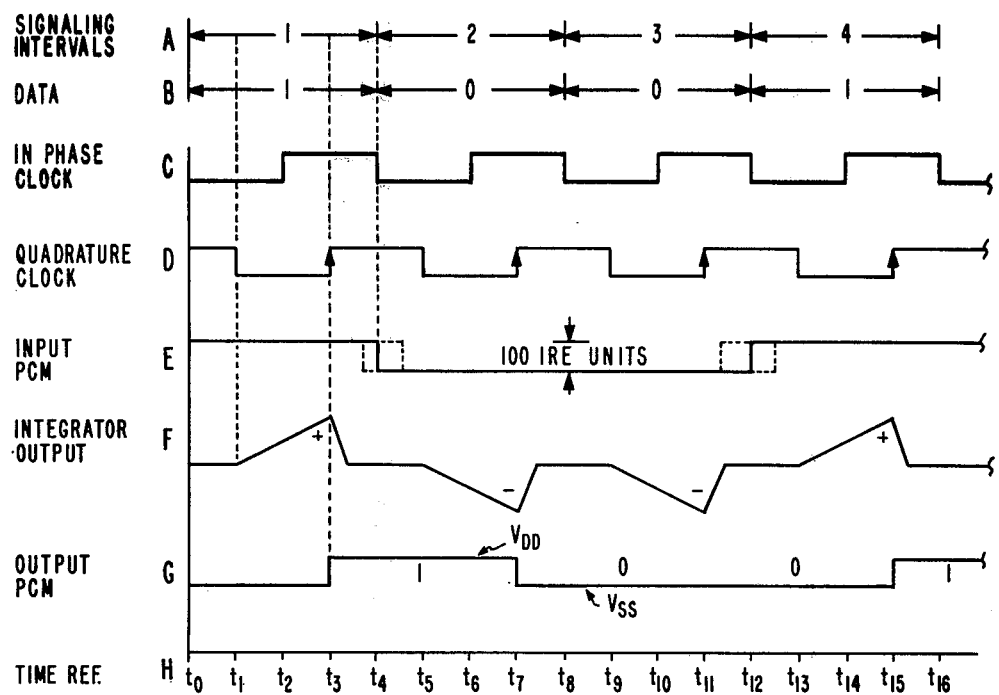
FIG. 2 is a diagram illustrating signal waveforms and timing relationships of the PCM detector of FIG. 1.

FIG. 2 illustrates operation of the detector during four consecutive signaling intervals (waveform A, intervals 1,2,3 and 4) for an assumed data message 1-0-0-1 (waveform B). Illustratively the message is represented by luminance level variations of nominally 100 IRE units (waveform E) and it is assumed that the luminance signal exhibits edge distortion during transition intervals. The uncertainty as to the luminance transitions is indicated by dashed lines in waveform E. Waveform C represents the output of bandpass filter 66 which is a signal in phase with the data signaling intervals. Waveform D is the output of phase adjuster 68 which is in phase quadrature with waveform C.

During the initial portion ($t_0-t_1$) and the terminal portion ($t_3-t_4$) of the first signaling interval waveform D is high whereby switch 78 is closed. This causes amplifier 70 to be self biased at the data threshold level of flip-flop 80 and maintains capacitor 76 in a discharged condition. During the central portion ($t_1-t_3$) of the first signaling interval waveform D is low whereby switch 78 is opened and capacitor 76 is charged in a positive sense (waveform F). When waveform D makes a positive transistion ($t_3$) switch 78 closes thereby resetting the integrator (discharging capacitor 76) and simultaneously clocking flip-flop 80. Since the integrator output (F) was positive relative to the threshold of flip-flop 80 at the time the waveform D positive transition took place a logic 1 will be latched in flip-flop 80. Since flip-flop 80 is only responsive to positive clock transitions (as assumed) the stored data will remain at the flip-flop output for a time equal to one signaling interval in length and will be delayed by a time equal to three quarters of a signaling interval (waveform G).

As illustrated in waveform F integration of the luminance signal takes place only during the central portion of each signaling interval. This is where transitions of the signal are lease likely to occur and where the signal to noise ratio is maximal. The integrator is effectively disabled during the initial and terminal portions of each of the signaling intervals where transitions are most likely to occur and so distortion of the signal during those times is effectively rejected.

Figure 3:
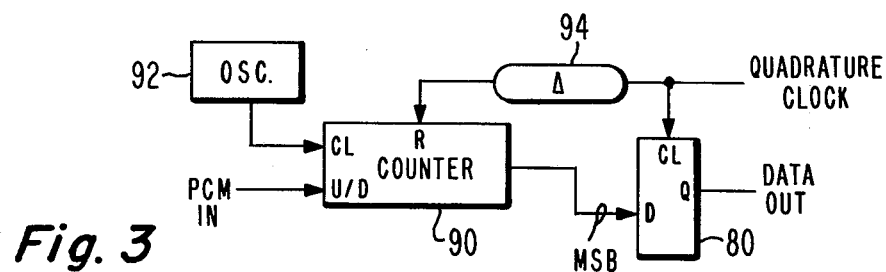
FIG. 3 is a block diagram illustrating certain modifications of the detector of FIG. 1.

FIG. 3 illustrates a modification of the invention for providing integration by means of an up-down counter 92. The counter is supplied with a high frequency clock signal by means of an oscillator 92 and the direction of count (up or down) is controlled by applying the PCM input signal to its UP/DOWN control input (U/D). Preferably the up/down logic threshold of counter 90 equals one half of the peak-to-peak luminance signal swing for digital data. Alternatively the luminance signal may be detected by means of a comparator biased at the equivalent of 50 IRE units (for data recorded as 0-100 IRE units) and the detector output used to control the direction of count. The most significant bit of the counter is applied to the data input of flip-flop 80 which is clocked by the quadrature clock signal as in FIG. 1. In order to insure that the data input to flip-flop 80 does not change at the time the quadrature clock positive transition occurs the clock signal is coupled to the counter reset terminal (R) input via a delay element 94.

Operation of the example of FIG. 3 is similar to that of FIG. 1. An exception is that "integration" of the PCM signal is performed by the counter rather than by a capacitor. The counter is reset to zero each time waveform D is high and counts up or down depending on the level of the PCM (luminance) signal when waveform D is low. If the total count is positive at the end of an "integration" period the most significant bit (MSB) will be logic zero and the flip-flop will be reset by the positive transition of the quadrature clock signal. This assumes that the number of counter stages and the frequency of oscillator 92 are selected such that the counter capacity is not exceeded (i.e., there is no carry to or borrow from the MSB stage) during the time the counter is enabled. For a negative total count the MSB will be a logic "1" at the end of an integration or counting period so that flip-flop 80 will be reset. To recover non-inverted output data the counter output (MSB) may be inverted prior to application to flip-flop 80 or the complemented ($\overline{Q}$) output of the flip-flop may be used rather than its true (Q) output.

What is claimed is:

1. A PCM detector for use in video reproducer apparatus of the type in which digital data is represented by serial synchronous pulse code modulation of a video signal produced by said apparatus and synchronously detected by means of a color burst component of said video signal, said video signal tending to exhibit leading and trailing edge distortion, said detector comprising:

oscillator means responsive to said color burst component of said video signal for producing a reference signal of predetermined phase relative to signaling intervals of said pulse code modulated video signal;

phase shifting means responsive to said reference signal for producing a clock signal in phase quadrature with said signaling intervals of said pulse code modulated video signal;

integrator means having an input terminal for receiving said pulse code modulated video signal and an output terminal for providing an integrated output signal;

control means responsive to said clock signal and coupled to said integrator means for enabling said integrator means when said clock signal is of a first value during the central portion of each signaling interval and for resetting said integrator means when said clock signal is of a second value during initial and terminal portions of each signaling interval; and output means responsive to transitions of said clock signal and to said integrated output signal for detecting said digital data corresponding to said pulse code modulated video signal at the end of each integration period and for storing said digital data until the end of the next integration period to produce a pulse code modulated digital data output signal having reduced leading and trailing edge distortion.

2. A PCM detector as recited in claim 1 wherein said color burst component of said video signal is subject to timebase errors and wherein said oscillator means includes means for varying said reference signal in accordance with said timebase errors.

3. A PCM detector as recited in claim 1 wherein said color burst component of said video signal is of a frequency different from that of said reference signal and is subject to timebase errors and wherein said oscillator means includes means for translating the frequency of said color burst component to that of said reference signal and for imparting timebase errors to said reference signal in accordance with the timebase errors of said color burst component.

4. A synchronous detector as recited in claim 1 wherein said output means comprises bistable means having a data input terminal coupled to an output terminal of said integrator means, a clock terminal coupled to receive said clock signal and an output terminal for providing said digital data output signal.

5. A synchronous detector as recited in claim 4 wherein said bistable means is of a type having a threshold voltage at said data input terminal lying within a predetermined range of values, and wherein said integrator means includes an amplifier of a type having a quiescent output voltage when biased by negative feedback which lies within said predetermined range of values.

* * * * *